Patented Feb. 9, 1932

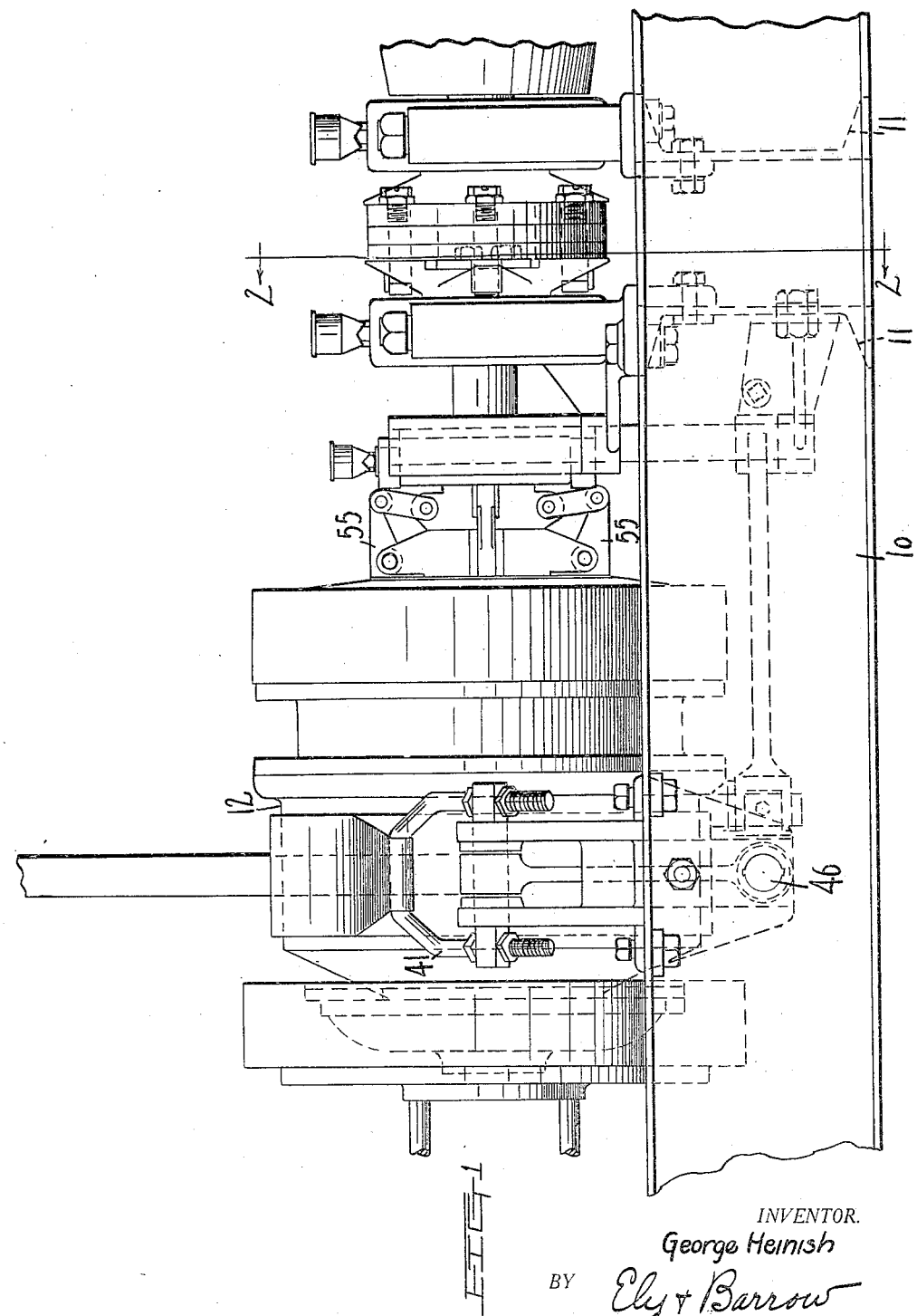

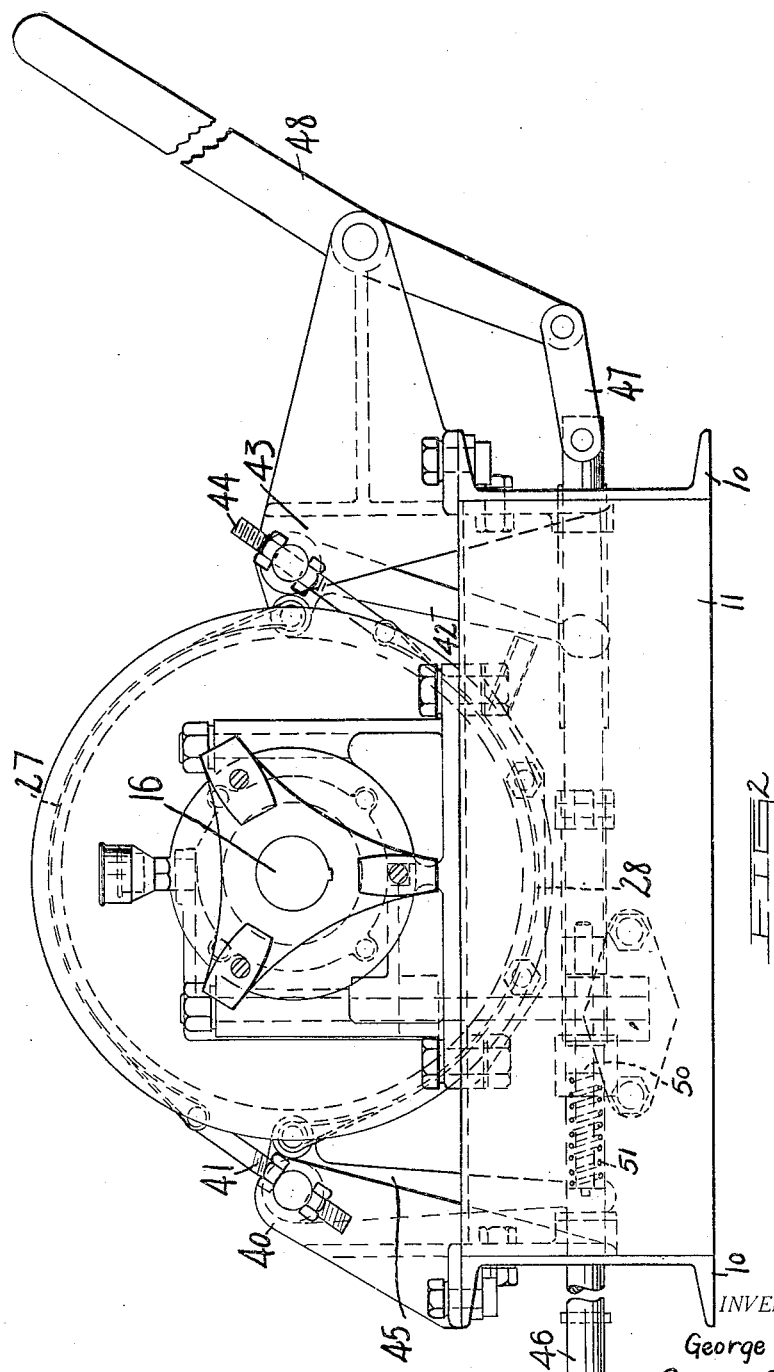

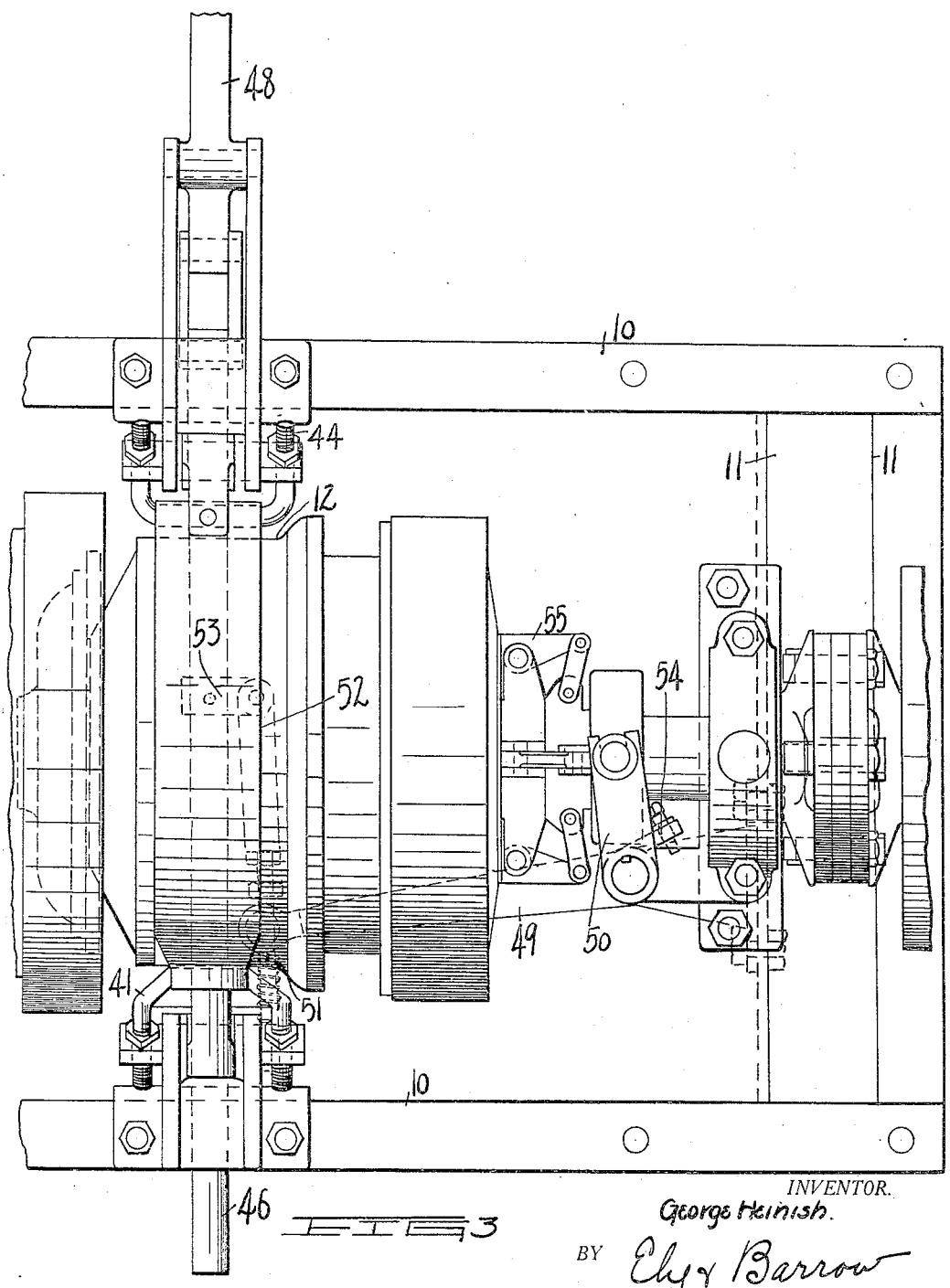

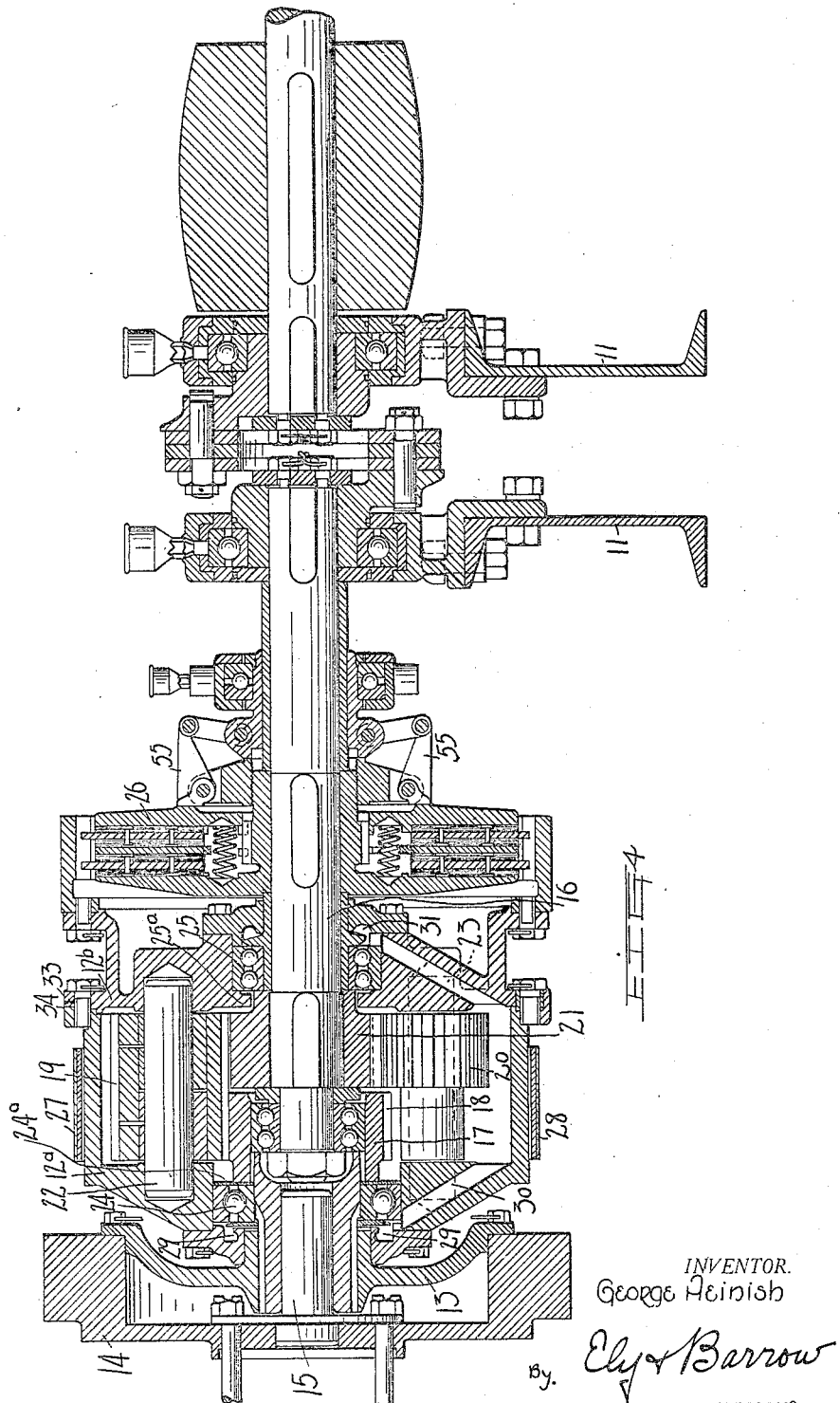

1,844,037

UNITED STATES PATENT OFFICE

GEORGE HEINISH, OF AKRON, OHIO, ASSIGNOR TO THE STAR DRILLING MACHINE COMPANY, OF AKRON, OHIO, A CORPORATION OF OHIO

TRANSMISSION

Application filed July 13, 1927. Serial No. 205,382.

This invention relates to transmissions, particularly of the planetary type.

The general purpose of the invention is to improve upon transmissions of this type by the provision of an improved brake device for use on the revolving casing or drum.

These transmissions have not been entirely satisfactory for the reason that the braking devices utilized therewith exert a bending force on the shafting and cause undue wear of the bearings and quite frequently breakage of the bearings, or even the casings. The object of the invention, therefore, is the provision in combination with this type of transmission of an improved brake therefor.

The foregoing and other objects are obtained by the device illustrated in the accompanying drawings and described below, it being understood that the invention is not limited to the specific form thereof shown and described.

Of the accompanying drawings,

Figure 1 is a side elevation of a transmission embodying the invention;

Figure 2 is a section on line 2—2 of Figure 1;

Figure 3 is a plan thereof; and

Figure 4 is a longitudinal, diametral section therethrough.

Referring to the drawings, the numerals 10, 10 indicate spaced, longitudinal channels and 11, 11 transverse channels connected thereto providing a support for a power unit including a transmission 12 of the planetary reverse gear type.

The transmission 12 includes a driving member 13 which may be connected to the fly wheel 14 of a motor (not shown), said member being mounted on a pilot shaft 15 driven by the motor and being journaled on a driven shaft 16 by bearing 17. Member 13 has a drive gear 18 thereon which is arranged to drive through reversing planet gears including those indicated at 19 and 20 in the usual way to a driven gear 21 mounted on shaft 16. The planet gears of the transmission are journaled upon studs, such as indicated at 22 and 23, mounted in casing 12, casing 12 being journaled upon member 13 by bearing 24 and on the driven shaft 16 by a bearing 25. A clutch 26 is provided to connect the transmission drum or casing 12 to shaft 16 and brake bands 27 and 28 are arranged to be engaged with casing or drum 12 to secure an increased speed in reverse through the planetary gearing contained within the casing.

Bearing 24 has a baffle 24ª arranged about it and about which oil can flow into and through the bearing. To prevent throwing of the oil from the bearing, an annular pocket is provided at 29 about the outer side thereof to receive the oil and radial ducts 30 are provided in casing 12 between studs 23 through which the oil from pocket 29 is forced back into the casing by centrifugal action.

The bearing 25 is arranged to be similarly lubricated, the construction of casing 12 about this bearing providing a baffle 25ª so that a separate oil baffle need not be employed, the pocket 31 about the outer side of the bearing receiving the oil passing through the bearing and radial ducts in the casing 12 delivering the oil from pocket 31 back into the casing.

Throwing of oil from between the casing parts 12ª and 12ᵇ is prevented by forming circumferential grooves, serrations or the like, as indicated at 33, on at least one of these parts or sections and bolting the parts together with a gasket 34 of compressible material disposed therebetween.

The brake device employed to operate bands 27 and 28 is best seen in Figure 2. The top band 27 is connected at one end to brackets 40 on one side of the casing 12 by an adjustable U-bolt 41, the other end of this band being connected to a bell crank lever 42 pivoted on brackets 43 on the other side of the casing 12. The lower band 28 is connected at one end by an adjustable U-bolt 44 to brackets 43 and at the other end to a bell crank 45 pivoted on brackets 40. Bell cranks 42 and 45 are arranged to be simultaneously actuated to apply or release the bands by means of a reciprocable rod 46 slidably mounted on channels 10 and connected by a link 47 to an operating lever 48. The rod 46 is also employed for shifting the clutch, a clutch shifting arm 49 for operating the shifting yoke 50 being yieldingly connected by a spring 51 to a link 52 connected to rod 46 at 53. This yielding connection is adapted not only to permit application of the brake bands 27 and 28 without effect upon the clutch shifting mechanism, but also provides yielding means normally holding the bands 27 and 28 free of casing 12. A stop device 54 is arranged on the clutch shifting device to limit its movement to released position and to cause the spring 51 to compress upon application of the brake bands. Toggle actuated pressure applying cams 55, 55 are employed in the clutch so that it will remain engaged when shifted into engagement by lever 48, the connection being such that a further movement of lever 48 after disengagement of the clutch will apply the brake bands 27 and 28 and, vice versa, a further movement of lever 48 after disengaging the bands 27 and 28 will engage the clutch.

By the use of two bands 27 and 28 and actuating devices therefor operating downwardly upon the upper band and upwardly upon the lower band, no bending forces are transmitted to the shaft through the casing bearings 24 and 25 to cause undue wear or breakage thereof or to cause breakage of the casing 12, the forces tending to bend the shaft being neutralized.

It will appear from the foregoing that by the invention, the brake devices employed with planetary transmissions or reversing gears have been greatly improved. It will also be apparent that modifications of the invention may be resorted to without departing from the spirit thereof or the scope of the appended claims.

What is claimed is:—

1. A brake construction for planetary gear transmissions of that type including central shafting and a rotatable drum on the shafting in which the gears are mounted including sun gears on the shafting and planet gears journaled in the drum, said brake comprising opposite members adapted to be arranged upon opposite sides of said drum, and means for simultaneously operating said members against said drum whereby braking stresses tending to bend said shafting are neutralized.

2. A brake construction for planetary gear transmissions of that type including central shafting and a rotatable drum on the shafting in which the gears are mounted including sun gears on the shafting and planet gears journaled in the drum, said brake comprising opposite bands adapted to be arranged upon opposite sides of said drum, and means for simultaneously tensioning said bands against the opposite sides of the drum in opposite directions, whereby braking stresses tending to bend said shafting are neutralized.

GEORGE HEINISH.